United States Patent [19]
Dilliner

[11] 4,407,252
[45] Oct. 4, 1983

[54] FUEL INJECTION SYSTEM

[75] Inventor: Monte M. Dilliner, Lineville, Iowa

[73] Assignees: Oscar E. Jones; Ted Lowe, both of Des Moines, Iowa; Robert F. Robinson, Fairfield, Ill.; a part interest

[21] Appl. No.: 270,639

[22] Filed: Jun. 4, 1981

[51] Int. Cl.³ .................. F02M 59/30; F02M 61/18
[52] U.S. Cl. .................. 123/504; 239/533.11; 417/534
[58] Field of Search ........... 123/445, 446, 504, 505; 417/269, 534, 539; 239/533.2-533.12, 584, 585

[56] References Cited

U.S. PATENT DOCUMENTS

| | | | |
|---|---|---|---|
| 1,445,100 | 2/1923 | Nelson | 123/505 X |
| 2,114,565 | 4/1938 | Kovach | 417/539 X |
| 2,148,112 | 2/1939 | Dillstrom | 123/504 X |
| 2,255,203 | 9/1941 | Wiegand | 239/533.5 X |
| 3,173,409 | 3/1965 | Warren | 123/169 R |
| 3,233,554 | 2/1966 | Huber et al. | 417/534 X |
| 3,361,077 | 1/1968 | Freeman | 417/269 |
| 3,373,724 | 3/1968 | Papst | 123/145 R X |
| 3,507,262 | 4/1970 | Stage | 123/504 |
| 3,816,029 | 6/1974 | Bowen et al. | 417/223 |

FOREIGN PATENT DOCUMENTS

| | | | |
|---|---|---|---|
| 739985 | 11/1955 | United Kingdom | 239/533.6 |
| 1328518 | 8/1973 | United Kingdom | 239/585 |

*Primary Examiner*—Tony M. Argenbright
*Attorney, Agent, or Firm*—Morton S. Adler

[57] ABSTRACT

A fuel injection system for internal combustion engines includes an improved direct injection pump having a reciprocating metering plunger and an improved injector for atomizing and injecting the fuel into the combustion chamber. Respective moving parts of the pump and injector are supported in low friction seals free of contact with other parts and require no lubrication from the fuel pumped or from other sources so as to operate efficiently without galling on gasoline or diesel engines on any combustible fuel or any combination of such fuels. The pump includes a housing provided at one end with a fuel chamber of a predetermined capacity that has a single opening for receiving fuel from a source of supply through a valved fuel inlet and from which opening, fuel is dispensed to the injector through a valved fuel outlet line. The metering end of the plunger is reciprocated within such chamber at selected intervals by a control system which is adjustable to vary the length of stroke of the plunger and thereby determine the amount of fuel ejected from the chamber on each stroke for regulating the speed of the engine. The system includes a novel combined fuel injector and thermal heater or glow plug combined in a single housing for mounting in the standard spark plug port. Because this new pump requires no lubrication from the fluid pumped or other extraneous materials affecting such fluids, it is also useful for chemical fluids which must be kept free of contamination.

17 Claims, 12 Drawing Figures

FUEL INJECTION SYSTEM

BACKGROUND OF THE INVENTION

This invention relates to improvements in fuel injection systems for internal combustion engines and including an improved injection pump for such systems and other purposes and an improved fuel injector.

It is generally recognized that the fuel injection system as used on high compression diesel engines, for example, is more efficient than the carburetor system traditionally used on the relatively low compression gasoline engine and with the current emphasis on fuel conservation and regulation of polutants from exhaust gases of internal combustion engines, interest in the fuel injection system for gasoline engines is rising in popularity with the result that various fuel injections systems for such engines have been designed to meet current standards for mileage and emmission controls. However, due to the various different operating characteristics between gasoline and diesel engines, the respective fuel injections systems for such engines as presently designed are sufficiently different to accomplish their respective purposes that they are not interchangeable and one type of engine cannot be converted to the other without structural changes in the engine as is well known. Thus, the present necessity for different injection systems for gasoline and diesel engines is a duplication in effort and expense.

An important consideration in the design of fuel injection systems is the fact that diesel fuel for the diesel engine has good lubricating properties while fuel such as gasoline, gasahol, alcohol and the like for gasoline engines has relatively poor lubricating properties. Consequently, while the injection pump and injector in a diesel injection system will receive adequate lubrication from the fuel pumped, this does not occur with gasoline engine fuels and, accordingly, present type fuel injection systems for gasoline engines include special design features to provide some form of auxiliary or supplemental fluid source of lubrication for the pump and injector for without lubrication, either from the fuel pumped or supplemental fluid source, present injection systems will gall and become inoperable.

With this observation in mind, it is one of the important objects of this invention to provide an improved fuel injection system for internal combustion engines that include an improved direct injection pump and injector designed to operate efficiently with any type of fuel irrespective of its lubricating properties and without association with such fluids or with supplementary sources of selected fluids for purposes of lubrication.

A further object herein is to provide a fuel injection system of the above class that is capable of efficiently operating either a gasoline or diesel engine on any combustible fuel or any combination of such fuels.

In the typical fuel injection system for multiple cylinder engines, the pumps are mounted in a common housing for operation by separate cams on a camshaft operated from the engine at half engine speed for four cycle engines and at engine speed for two cycle engines. The pump assembly includes separate rotatable grooved plungers operating at a constant full stroke between separate fuel inlet and outlet ports in a timed sequence to synchronize the measured amount of fuel delivered to each cylinder. Such timing depends upon rotation of the plungers effected by a unitary control means such as the commonly used control rack connected to all pumps in a well known manner. Thus, by reason of such unitary control, if one pump becomes locked in inoperative position for any reason such as by galling, the control rack is also rendered inoperable and the remaining pumps become immovable at various positions relative to fuel intake and fuel outlet so as to disrupt the designed timed cycles of the system and resulting in the engine stopping or running out of control. Also typical in such injection systems is the wobble plate means for operating the pumps instead of the camshaft and control rack. With the wobble plate system, fuel is metered by a single axially located rotary valve in the wobble plate unit and when one of the pumps becomes inoperative, speed control of the engine is no longer possible. Accordingly, it is another important object herein to provide an improved fuel injection pump and injector for use in a multiple cylinder internal combustion engine which includes a control system separately operable relative to each pump so that if one pump fails, fuel injection from such pump is stopped and the remaining pumps will continue to operate in their intended cycle.

Another feature of this invention is to provide an improved fuel injection system as characterized that will permit an ordinary gasoline engine to be converted from the carburetor system to the injection system by removal of the carburetor system components such as spark plugs, ignition, coil, carburetor, points, fuel pump and the like but with no other structural changes in the engine. For this purpose, another object herein is to associate a pump of the above class with a novel combined fuel injector and thermal heater or glow plug arranged in a single housing for mounting in the standard spark plug port to eliminate the requirement of boring a separate port in the engine to the combustion chamber for use of such heater when desired.

Still other objects of this invention are to provide a fuel injection system as characterized which can be adjusted for operation on high and low compression engines and precisely meter and efficiently atomize only that amount of fuel required for engine operation at any given speed and which materially increases the efficiency of the internal combustion engine to produce a substantially higher number of miles per gallon of fuel than present fuel systems.

A further object is to provide a fuel injection system of the above class that produces efficient, complete and clean burning of the fuel whereby pollutants in exhaust gases are only minimal and far below current standards and regulations on emmision control.

Another object to to provide a fuel injection system as characterized that will operate efficiently on either two or four cycle single or multiple cylinder engines without structural changes in such engines.

Yet another object herein is to provide an improved injection pump as characterized wherein because the working parts are sealed within a suitable housing and require no lubrication from the fluid pumped or from extraneous materials affecting such fluids, such pump has special utility in use with chemical fluids that must be kept free of contamination.

SUMMARY OF THE INVENTION

The improved injection pump in this invention includes a housing provided at one end with a fuel chamber of a predetermined capacity that has a single opening for receiving fuel from a source of supply through a valved fuel inlet line and from which opening, fuel is dispensed to the injector through a valved fuel outlet line for delivery to the combustion chamber. The metering end of a plunger is reciprocated within such chamber at selected intervals by a control system which is adjustable to vary the length of the stroke of the plunger and thereby determine the amount of fuel ejected from the chamber on each stroke for regulating the speed of the engine. The working parts of both the pump and injector are supported in low friction seals free of contact with other parts and require no lubrication from the fuel pumped or from other sources so as to operate efficiently without galling on gasoline or diesel engines on any combustible fuel or any combination of such fuels. For converting ordinary gasoline engines from the carburetor system to the injection with no structural changes in the engine but with removal of the carburetor system components such as spark plugs, ignition, coil, carburetor, points and the like, this fuel injection system for internal combustion engines includes a novel combination fuel injector and thermal heater or glow plug in a single housing for mounting in the standard spark plug port in the engine to the combustion chamber for use when desired. The control system for the pumps includes a cam operating from a camshaft powered by the engine and in multiple pump units for multiple cylinder engines, a single cam is designed to operate two pumps. A governor device can be utilized for stationary engines.

Because this new pump requires no lubrication from the fluid pumped or other extraneous materials affecting such fluids, it has special utility for chemical fluids which must be kept free of contamination.

The foregoing objects and such further objects as may appear herein, or be hereinafter pointed out, together with the advantages of this invention will be more fully discussed and developed in the more detailed description of the accompanying drawings.

DESCRIPTION OF THE PREFERRED EMBODIMENTS

Figure 1:
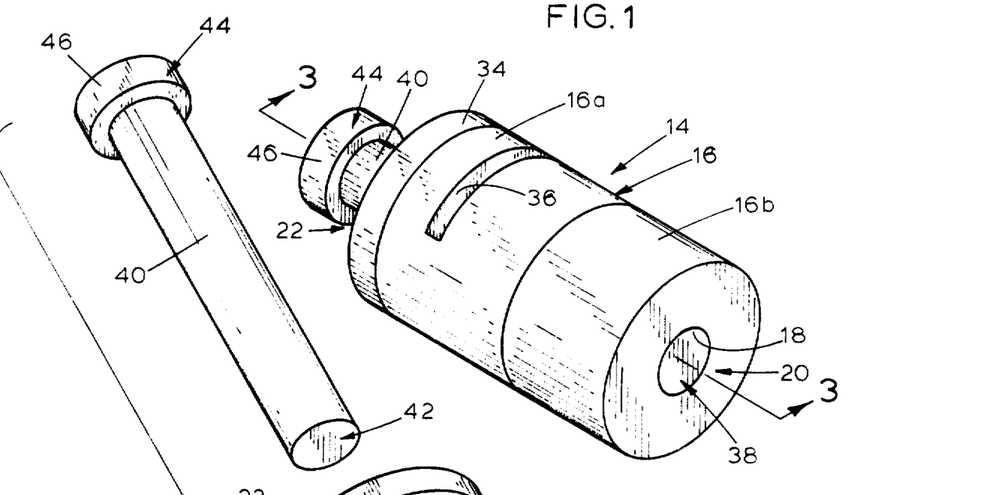
FIG. 1 is a perspective view of the new injection pump forming a part of this invention.
Figures 2, 3, 4:
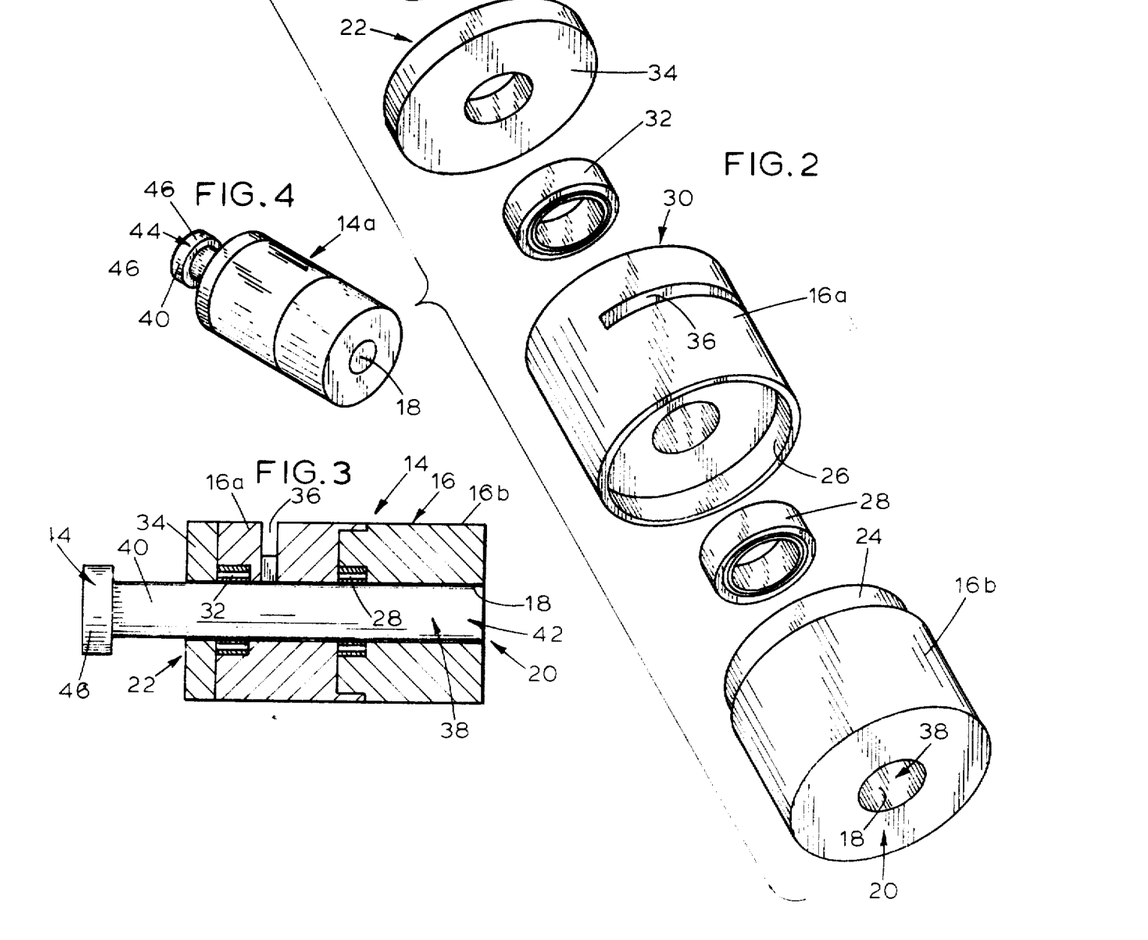
FIG. 2 is an enlarged exploded perspective view of the pump in FIG. 1.
FIG. 3 is a cross sectional view taken on the line 3—3 of FIG. 1.
FIG. 4 is a reduced perspective view showing a second embodiment of the pump in FIG. 1.

Referring to the drawings, the new direct injection pump which is one of the important features of this invention is designated generally by the numeral 14 (FIG. 1) and comprises a pump body 16, formed for purposes of assembly as will appear, into joinable sections 16a, 16b, and provided with a through bore 18 defining a first end 20 and a second end 22. Pump body sections 16a, 16b are joined by a snug friction fit between the reduced annular boss end 24 on 16b into the annular flange extension 26 on 16a as best seen in FIG. 2 and before this is done, a high pressure seal 28 is fitted into bore 18 at end 24 of 16b. At end 30 of 16a, a low pressure seal 32 is fitted into bore 18 and protected by the juxtaposed washer 34. A slot 36 in body section 16a, which serves as a fuel outlet port for certain purposes as will appear, communicates with bore 18 intermediate seals 28, 32. Slot 36 is designed for pump 14 use in environments of high pressure and for low pressure conditions is not required as shown as 14a in FIG. 4 where such pump is otherwise similar to pump 14 although both seals can be low pressure types, if desired.

Thus far described, it is pointed out that in pump section 16b, the area in bore 18 between the high pressure seal 28 and end 20 defines a chamber 38 designed to accommodate only a predetermined amount of fuel or fluid and, preferably, for such purposes, I have made the bore 18 with a diameter of two hundred fifty thousandths and exactly seven sixteenths of an inch between end 20 and seal 28 which is adequate to efficiently operate engines up to eight hundred cubic inch displacement. It will be understood, however, that such dimensions are not critical and may be varied.

A plunger 40 having a metering end 42 and a drivable end 44, preferably provided with an enlarged head or cap 46, is slidably journalled in and supported by seals 28, 32 (FIG. 3) so as to be free of frictional contact with any portion of body sections 16a, 16b and both seals 28, 32 are made of a suitable material having low friction properties such as products of synthetic resin polymers and the like which permit the efficient reciprocation of plunger 40 without the requirement for lubrication from any source. In the reciprocal movement of plunger 40, the metering end 42 moves in chamber 38 between end 20 and seal 28 with the drivable end 44 disposed exteriorly of end 22.

While pump 14 as a fuel injection pump can be used on single or multiple cylinder engines, it will be most advantageously employed on the multiple cylinder internal combustion engine on automotive vehicles and will thus be described in relation to such use with reference being had more particularly first to FIGS. 5-7 and later to FIGS. 8-12.

Figure 5:
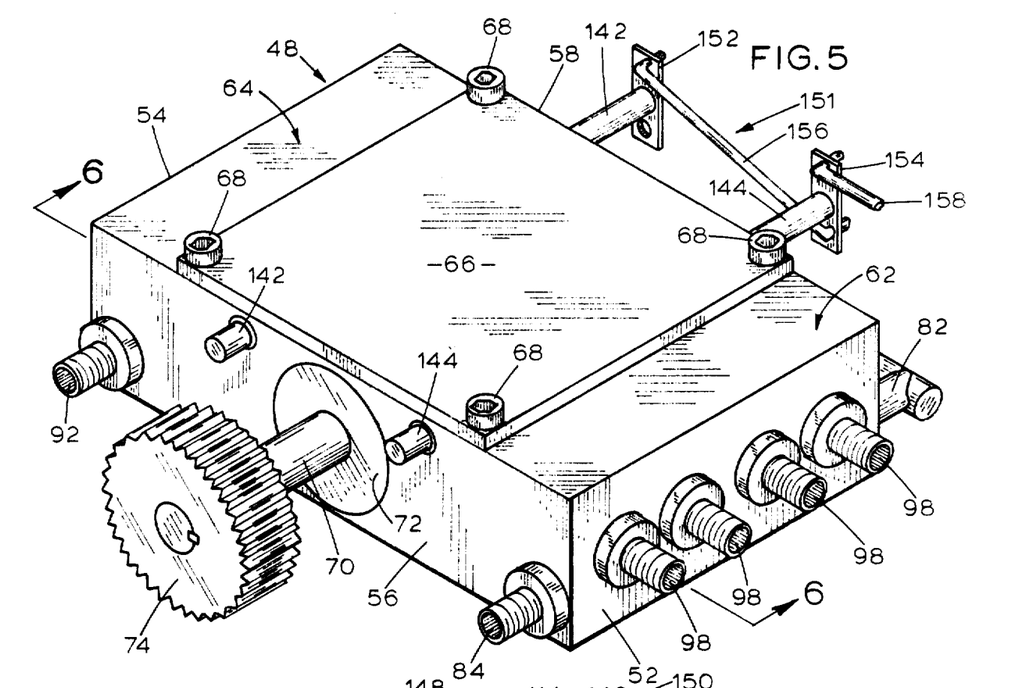
FIG. 5 is a perspective view of a pump assembly unit for a multiple cylinder internal combustion engine housing a plurality of pumps of FIG. 1 and controls therefor.
Figures 6, 7:
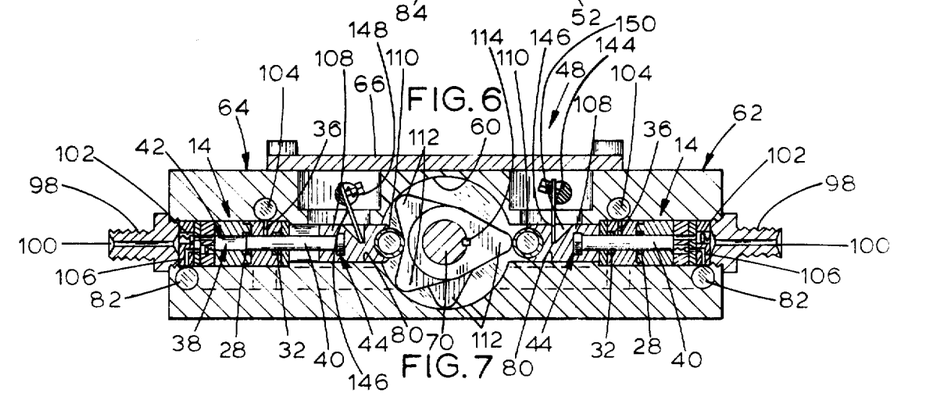
FIG. 6 is a cross sectional view taken on the line 6—6 of FIG. 5.
FIG. 7 is a schematic view showing the fuel flow pattern between the pump assembly of FIG. 5 and the engine and fuel supply and the throttle control for the pump assembly.
Figures 8, 9, 10, 12:
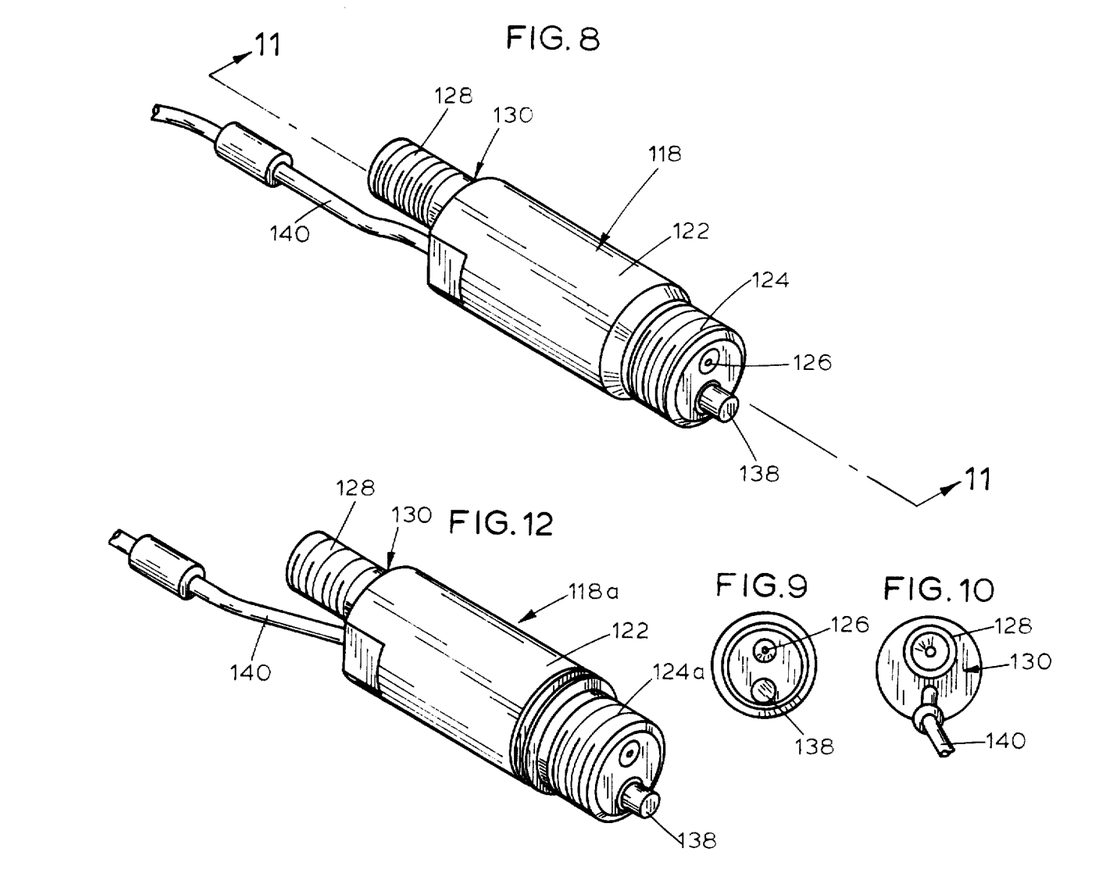
FIG. 8 is a perspective view of a new combined fuel injector and thermal heater for selective use in this fuel injection system.
FIG. 9 is an end view from the right side of FIG. 8.
FIG. 10 is an end view from the left side of FIG. 8.
FIG. 12 is a perspective view showing a second embodiment of the device in FIG. 8.
Figure 11:
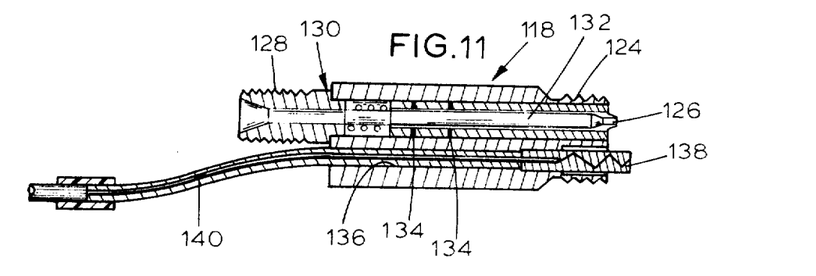
FIG. 11 is a cross sectional view taken on the line 11—11 of FIG. 8.

A pump housing as shown generally at 48 in FIG. 5 is designed for direct fuel injection operation to a multiple cylinder engine represented schematically at 50 in FIG. 7. While no specific shape or size is required for housing 48, I have preferably made it box-like defining first and second ends 52, 54, spaced sides 56, 58 and provided with a through bore 60 intermediate ends 52, 54 and extending between sides 56, 58 to divide housing 48 into the substantially equal first and second sections 62, 64 at respective opposite sides of bore 60 and by way of information only and not limitation, housing 48 represents a device that is approximate five inches wide, six inches long and three and one half inches high. A removable cover plate 66 providing access to the interior of housing 48 is secured by bolts 68.

A drive shaft 70, in suitable bearings 72, is mounted in bore 60 and projects beyond using side 56 where it carries a gear wheel 74 for operable engagement with gear wheel 76 on the crankshaft 78 of engine 50 in a well known manner, it being understood that shaft 70 will be geared to operate at half engine speed for four cycle engines and at engine speed for two cycle engines.

Engine 50 as seen in FIG. 7 is shown with a complement of eight cylinders in a well known manner and while housing 48 as will be described has been designed for compactness for use with the engine shown, it will be understood and appreciated that the system to be described can be used efficiently on engines having less or more than eight cylinders with no changes in operating characteristics.

Each section 62, 64 of housing 48 is provided with a like number of elongated chambers 80 (FIG. 6) arranged in parallel planar relationship between housing sides 56, 58 so that in section 62, for example, one end of each chamber communicates with housing end 52 and the other end communicates with bore 60. Likewise, in section 64, one end of each chamber communicates with housing end 54 and the other end communicates with bore 60. Each chamber 80 in each section 62, 64 has an axis perpendicular to the axis of shaft 70 and each chamber in one section at one side of shaft 70 is axially aligned with one other chamber in the other section. The total number of chambers 80 in sections 62, 64 correspond to the total number of cylinders served so that in housing 48 as shown where an even number of cylinders is involved, chambers 80 in respective sections 62, 64 represent half of the number of engine cylinders.

A continuous fuel passageway 82 through housing 48 includes an inlet port 84 at one end of housing side 56 (FIG. 5) for operable connection through line 86 and pump 88 (FIG. 7) to the fuel tank or source of supply 90 and the outlet port 92 at the opposite end of side 56 connected through line 94 and pressure release valve 96 for return to tank 90 (FIG. 7). A respective fuel line fitting 98 (FIGS. 5,6) is provided on each housing end 52, 54 for communication with each chamber 80 through end 20 and a pump 14 in each chamber 80 has the pump fuel chamber 38 in communication with the outlet channel 100 in fitting 98 through valve 102. A fuel conduit 104 (FIG. 6) in each section 62, 64 disposed transversely of chambers 80 communicates at one end with passageway 82 for return to tank 90 and also communicates with the respective slots or fuel outlet ports 36 on each pump 14 whereby any fuel in chambers 38 that may under high pressures traverse the seals 28 will be returned to tank 90. Fuel supply to each pump chamber 38 into end 20 is through the valved inlet line 106 connected to passageway 82.

A cam follower 108 for each pump 14 is reciprocably journalled in each chamber 80 in operable engagement at one end with the drivable end 44 of respective plungers 40 and has its other end formed with an arcuate outline 110 for communication with the bore 60. Within bore 60, a plurality of single lobe cams 112 are keyed 114 to shaft 70 in spaced relationship and where opposed housing sections are used such as 62, 64, there is one cam 112 for each opposed pair of chambers 80 in which pumps 14 and cam followers 108 are disposed. By this arrangement, rotation of shaft 70 will cause each cam 112 to alternately act against opposed cam followers 108 and the position of each cam 112 provides for the actuation of pumps 14 in a sequence corresponding to the firing order of the engine 50. Each fitting 98 relative to each pump 14 is connected by a fuel line 116 to a fuel injector 118 attached to the access port to the combustion chamber of the engine 50 illustrated schematically at 120 for one port in FIG. 7, it being understood that engine 50 has a like port and injector relative to each line 116 shown. It is further noted that with this fuel system as described, no components of the carburetor system such as spark plugs, points, ignition, carburetor and the like are required and when this system is used on a gasoline engine, such components are removed.

Injector 118 may be any well known type commercially available but to improve the efficiency of the present direct injection system, injector 118 shown more in detail in FIGS. 8-12 is an improvement over present type injectors known by combining in a single fitting for port 120, the features of fuel delivery and a thermal heater to facilitate combustion. As best seen in FIGS. 8-12, injector 118 includes a body member 122 having the threaded end 124 for removable engagement in port 120 and injector 118a in FIG. 12 has the modified end 124a to accomodate different ports 120 but is otherwise similar to injector 118. Body 122 is provided with a through fuel passageway 126 communicating with a fuel line fitting 128 at end 130 for attachment to line 116 and contains the spring loaded spray nozzle assembly 132 by which injection pressures to the combustion chamber can be adjusted up to 10,000 p.s.i. according to the requirements of different engines. An important feature in the mounting of nozzle assembly 132 is the use of low friction support seals 134 made of material similar to seals 28, 32 by means of which nozzle assembly 132 requires no lubrication from the fuel pumped or from other sources. Body 122 is also provided with a second through passageway 136 parallel to 126 in which is mounted an electrically actuated thermal heater element 138 disposed to project from end 124 and adapted for connection to a source of electric current through cord 140. An important advantage of injector 118 as described is the fact that in a single fitting attachable to a standard spark plug port on a gasoline engine, for example, it provides for both fuel injection and thermal heat to the compressed air in the combustion chamber. Thus, in converting a gasoline engine from the carburetor system to the fuel injection system, the use of the thermal heater or glow plug, when desired, does not require the boring of a second port in the engine for the thermal heater which is normally required for low compression engines using such component. Such injector 118 can also be used to replace the standard injection pump assembly on a diesel engine whereby any type of combustible fuel can be used.

Thus far described, it will be noted that the fuel capacity of pump chambers 38 is fixed and equal and the metering end 42 of plungers 40 is capable of reciprocating the full length of each chamber between the high pressure seal 28 and end 20. Accordingly, the distance of movement of metering end 42 within chamber 38 on each stroke of plunger 40 determines the amount of fuel delivered to injector 118 so that the longer the stroke, the faster the engine speed and vice versa. A control means to vary the length of stroke of plungers 40 at a rate proportional to engine speeds includes a pair of spaced rotatable control rods 142, 144, one for each section 62, 64, (FIG. 5) suitably journalled through housing 48 parallel to and on opposite sides of shaft 70 so as to extend transversely of the cam followers 108. Each rod 142, 144 carries a plurality of radially depending control levers 146, spring loaded as at 148, so that one such lever on each rod extends into a recess 150 in a respective follower 108. All levers 146 on each rod 142, 144 depend at the same angle for their basic position whereby rotation of rods 142, 144 will correspondingly move the cam followers 108 toward or away from chamber 38 to correspondingly determine the precise position of the metering end 42 in chamber 38 at any given time. Rods 142, 144 are simultaneously rotated in opposite directions by a linkage means 151 which includes a vertical bar 152 on end end of rod 142 exteriorly of housing side 58 and a similar bar 154 on the corresponding end of rod 144 and with a rod link 156 connected to the top end of bar 152 and the bottom end of bar 154. A flexible cable 158 connected to the top of bar 154 extends to a spring loaded connection 160 operable connected to a lever control means illustrated schematically in FIG. 7 as a foot pedal 162. Depression of pedal 162 pulls cable 158 to rotate rod 144 clockwise and rod 142 counterclockwise so that levers 146 on each rod 142, 144 are simultaneously moved a like distance towards each other to correspondingly move each follower 108 and position each metering end 42 at the same relative position within chamber 38.

OPERATION

With this fuel system mounted on an internal combustion engine as described, engine 50 is started in a conventional manner which starts the fuel flow from tank 90 through housing 48 via the inlet port 84 through passageway 82 and the outlet port 92 back to tank 90 and also starts the rotation of shaft 70 by its geared connection to crankshaft 78 through wheels 74, 76. Fuel chambers 38 in pumps 14 are filled from passageway 82 through valves 106 into end 20 and fuel is ejected from end 20 through valves 102 through lines 116 to the injectors 118.

With pedal 162 retracted, control levers 146 on respective rods 142, 144 are angularly disposed away from each other to their furthermost point to position the respective cam followers 108 and associated plungers 40 so that plungers 40 occupy a substantial portion of chamber 38 and thereby reduce the fuel capacity of such chambers to the area between the metering end 42 of plungers 40 and chamber end 20 which is sufficient for idling as the several cams 112 act against the several followers 108 to move plunger ends 42 toward chamber ends 20 for ejecting fuel through lines 116 to injectors 118. During rotation of shaft 70, and as a given cam 112 acts upon a given follower 108 to move an associated plunger 40, lever 146 will yield as plunger rod 40 makes its ejection stroke and the position of lever 146 in response to the position of pedal 162 will determine the point in chamber 38 to which plunger end 42 will retract for a succeeding supply of fuel to chamber 38. As pedal 162 is depressed, levers 146 with rotation of rods 142, 144 move simultaneously towards each other to correspondingly establish the position of plunger ends 42 further from chamber end 20 and increase the fuel capacity of chamber 38 whereby more fuel is received in chamber 38 and ejected from each chamber on each plunger stroke to increase the engine speed. Should fuel for any reason under high pressures get by metering end 42 and the high pressure seal 28, it will move through slot 36 in pump 14 and conduit 104 to the fuel passageway 82 for return to tank 90. By this arrangement, only that amount of fuel required for a given speed is directed to injector 118 where the adjustment of nozzle assembly 132 according to the variables of the engine and fuel used fully atomizes the fuel for combustion for a complete and clean burning so that pollutants in exhaust gases are only minimal and far below current standards and regulations on emission controls.

The use in pump 14 of the low friction seals 28, 32 in supporting plungers 40 free of contact with the pump body 16 and the use of similar type seals 134 in the nozzle assembly 132 results in the present fuel injection system requiring no lubrication from the fuel pumped or from other sources so this system can be used efficiently on gasoline and diesel engines with either gasoline or diesel fuels or any combination thereof. This is in contrast to present injection pumps which require lubrication either from the fuel pumped for diesel system or from other sources for gasoline systems and which will gall and stop without such lubrication. In addition, the arrangement in this fuel system of separate and independent fuel lines to each pump together with independently acting means for reciprocating each plunger makes possible the continued controlled operation of the engine even if one of the pumps should fail for any reason. In such an event, fuel flow from such pump ceases without affecting the other pumps.

The new injector 118, combining in one fitting the functions of fuel injection and thermal heat not found in present injectors, makes this fuel system particularly advantageous in converting the low compression gasoline engine from the carburetor system to an injection system since no separate port to the combustion chamber of the gasoline engine is required. With diesel engines, injector 118 provides an important aid to starting particularly in cold temperatures.

As previously indicated, all components of the carburetor system on the gasoline engine are removed when the present injection is used. The regular atmospheric air intake and air filter are retained and no structural changes in the engine are required although it may be necessary to provide a sleeve or riser tube connection between the opening left by removal of the carburetor and the air intake.

It is also noted that pump 14, because it requires no lubrication from the fluid pumped or from sources affecting such fluid, can be made in any suitable size for moving chemical fluids that must be kept free of contamination.

Accordingly, in view of all of the foregoing, it is thought a full understanding of the construction and operation of this invention will be had and the advantages of the same will be appreciated.

I claim:

1. A fuel injection system for an internal combustion engine having a cylinder and a combustion chamber therefor, an access port to said combustion chamber, a source of fuel supply, a fuel conduit connected to said source of supply and a means for supplying fuel from said source of supply to said fuel conduit, said system comprising:

a pump body having a through bore defining a first and second end, a high pressure seal mounted in said body at a predetermined point spaced inwardly from said first end to define a fuel receiving chamber, a low pressure seal mounted in said body intermediate said second end and said high pressure seal, a plunger having a metering end and a drivable end and journalled through and supported in said seals free of contact with said pump body and reciprocable relative thereto in a working stroke with the metering end of said plunger designed to move in said chamber between said high pressure seal and said first end, each of said seals being of a material having low friction properties so that said plunger in reciprocation requires no lubrication from the fuel pumped or from other sources, a valved fuel inlet line to said chamber connected to said fuel conduit, a fuel injector mounted in the access port to said combustion chamber, said injector comprising:

a body member provided with a through fuel passageway, an adjustable spring loaded nozzle assembly in said passageway supported in spaced seal members free of contact with said body member, and said seal members being of a material having low friction properties so that said nozzle assembly in operation requires no lubrication from the fuel pumped or from other sources, a valved fuel outlet line from said chamber to said injector, and means for acting against the drivable end of said plunger to vary the length of stroke thereof for ejecting selectively varied precise amounts of fuel through said outlet line to said injector at a rate proportional to desired engine speeds.

2. A fuel injection system as defined in claim 1 including said valved fuel inlet and outlet lines each operably associated with said first end of said chamber.

3. A fuel injection system as defined in claim 1, including:

a second passageway in said body member, and a thermal heater mounted in said second passageway to extend exteriorly of that end of said body member of said injector mounted in said access port.

4. As a new article of manufacture, a fuel injector comprising:

a body member adapted to be removably mounted in the access port to the combustion chamber of an internal combustion engine, a fuel passageway through said body member for communication with said chamber, an adjustable spring loaded nozzle assembly in said passageway supported in spaced seal members free of contact with said body member, and said seal members being of a material having low friction properties so that said nozzle assembly in operation requires no lubrication from the fuel passed therethrough or from other sources.

5. A fuel injector as defined in claim 4, including:

a second passageway through said body member, and a thermal heater mounted in said second passageway for operable relationship with the combustion chamber of the engine.

6. A fuel injection system for multiple cylinder internal combustion engines having a combustion chamber for each cylinder, an access port to each combustion chamber, a source of fuel supply, a fuel conduit connected to said source of supply and means for supplying fuel from said source of supply to said fuel conduit, said system comprising:

a pump for each cylinder with each pump including a body having a through bore defining a first and second end, a high pressure seal mounted in said body at a predetermined point spaced inwardly from said first end to define a fuel receiving chamber, a low pressure seal mounted in said body intermediate said second end and said high pressure seal, a plunger having a metering end and a drivable end and journalled through and supported in said seals free of contact with said pump body and reciprocable relative thereto in a working stroke so that the metering end of said plunger will move in said chamber between said high pressure seal and said first end and the drivable end of said plunger projects from said second end of said pump body, each of said seals being of a material having low friction properties so that said plunger in reciprocation requires no lubrication from the fuel pumped or from other sources, a valved fuel inlet line for each pump operable relative to said fuel conduit and said pump chamber, a fuel injector mounted in the access port to each combustion chamber, said injector comprising:

a body member provided with a through fuel passageway, an adjustable spring loaded nozzle assembly in said passageway supported in spaced seal members free of contact with said body member, and said seal members being of a material having low friction properties so that said nozzle assembly in operation requires no lubrication from the fuel pumped or from other sources, a valved fuel outlet line for each pump operable relative to said chamber and a respective injector, means for acting on the drivable end of said plungers for ejecting fuel from said chambers to said injectors in the same sequence as the firing order for said engine, and means for varying the length of stroke of said plungers for ejecting precise amounts of fuel through said outlet line to said injectors at a rate proportional to desired engine speed.

7. A fuel injection system as defined in claim 6 including said valved fuel inlet and outlet lines each operable relative to a respective pump chamber through the first end thereof.

8. A fuel injection system as defined in claims 6 or 7 wherein said injector includes:

a second passageway in said body member, and a thermal heater mounted in said second passageway to extend exteriorly of that end of said body member of said injector mounted in said access port.

9. A fuel injection system for multiple cylinder internal combustion engines having a combustion chamber for each cylinder, an access port to each combustion chamber, a source of fuel supply, a fuel conduit connected to said source of supply and means for supplying fuel from said source of supply to said fuel conduit, said system comprising:

a pump for each cylinder with each pump including a body having a through bore defining a first and second end, a high pressure seal mounted in said body at a predetermined point spaced inwardly from said first end to define a fuel receiving chamber, a low pressure seal mounted in said body intermediate said second end and said high pressure seal, a plunger having a metering end and a drivable end and journalled through and supported in said seals free of contact with said pump body and reciprocable relative thereto so that the metering end of said plunger is capable of reciprocating in said chamber between said high pressure seal and said first end and the drivable end of said plunger projects from the second end of said pump body, each of said seals being of a material having low friction properties so that said plunger in reciprocation requires no lubrication from the fuel pumped or from other sources, a pump housing provided with a through fuel passageway defining an inlet port connected for flow communication to said fuel conduit and an outlet port connected for flow communication to said source of supply, said housing provided with a plurality of chambers corresponding in number to the number of cylinders in the engine, a separate one of said pumps in each housing chamber, a fuel injector mounted in the access port to each combustion chamber, a valved fuel inlet line for each pump operable relative to said fuel passageway and said pump chamber, a valved fuel outlet line for each pump operable relative to said pump chamber and a respective injector, a first means in said housing for acting on the drivable end of said plungers for ejecting fuel from said pump chambers to said injectors in the same sequence as the firing order for said engine, said first means comprising:
  a drive shaft suitably mounted in said housing for operable engagement with the engine, and
  a plurality of cams on said drive shaft, and a second means on said housing operable relative to said plungers and said first means for varying the length of stroke of said plungers for ejecting precise amounts of fuel through said outlet line to said injectors at a rate proportional to desired engine speeds, said second means comprising:
  a cam follower in each housing chamber operably connected to the drivable end of said plunger therein,
  each cam follower disposed to be acted on by a corresponding cam in a timed sequence for reciprocating said plungers,
  a respective control lever engageable with each cam follower for moving the same to position the metering end of said plunger at varying positions within said fuel chamber intermediate said high pressure seal and said first end of said pump body to regulate the fuel capacity of said chamber and the amount of fuel ejected therefrom on a given stroke,
  a lever control means, and
  linkage means between said lever control means and said control levers whereby the plunger positions in the several pump fuel chambers are simultaneously and similarly controlled by said lever control means in proportion to the desired engine speed.

10. A fuel injection system as defined in claim 9 including said valved fuel inlet and outlet lines each operable relative to a respective pump chamber through the first end thereof.

11. A fuel injection system as defined in claim 9, including:
  each pump body provided with a fuel outlet port intermediate said seals and in communication with said plungers, and
  a conduit in said housing communicating with each fuel outlet port and said fuel passageway to return to said source of supply any fuel that may traverse any high pressure seal.

12. A fuel injection system as defined in claim 9 wherein said injector comprises:
  a body member provided with a through fuel passageway,
  an adjustable spring loaded nozzle assembly in said passageway supported in spaced seal members free of contact with said body member, and
  said seal members being of a material having low friction properties so that said nozzle assembly in operation requires no lubrication from the fuel pumped or from other sources.

13. A fuel injection system as defined in claim 9 wherein said injector comprises:
  a body member provided with a through fuel passageway,
  an adjustable spring loaded nozzle assembly in said passageway supported in spaced seal members free of contact with said body member,
  said seal members being of a material having low friction properties so that said nozzle assembly in operation requires no lubrication from the fuel pumped or from other sources,
  a second passageway in said body member, and
  a thermal heater mounted in said second passageway to extend exteriorly of that end of said body member of said injector mounted in said access port.

14. A fuel injection system for multiple cylinder internal combustion engines having a combustion chamber for each cylinder, an access port to each combustion chamber, a source of fuel supply, a fuel conduit connected to said source of supply and means for supplying fuel from said source of supply to said fuel conduit, said system comprising:
  a pump for each cylinder with each pump including a body having a through bore defining a first and second end,
  a high pressure seal mounted in said body at a predetermined point spaced inwardly from said first end to define a fuel receiving chamber,
  a low pressure seal mounted in said body intermediate said second end and said high pressure seal,
  a plunger having a metering end and a drivable end and journalled through and supported in said seals free of contact with said pump body and reciprocable relative thereto so that the metering end of said plunger is capable of reciprocating in said chamber between said high pressure seal and said first end and the drivable end of said plunger projects from the second end of said pump body,
  each of said seals being of a material having low friction properties so that said plunger in reciprocation requires no lubrication from the fuel pumped or from other sources,
  a pump housing provided with a through fuel passageway defining an inlet port connected for flow communication to said fuel conduit and an outlet port connected for flow communication to said source of supply, said housing provided with a plurality of chambers corresponding in number to the number of cylinders in the engine, a separate one of said pumps in each housing chamber, a fuel injector mounted in the access port to each combustion chamber, said pump housing being of a box-like configuration defining first and second ends, spaced sides and provided with a through bore between said sides intermediate said ends to divide said housing into first and second sections, a drive shaft in suitable bearings mounted in said bore, a gear wheel on one end of said drive shaft adapted for operable connection to the engine, said housing chambers arranged in equal numbers in a planar spaced relationship perpendicular to the axis of said drive shaft in said housing sections so that each chamber in one section is axially aligned with one chamber in the other section on opposite sides of said drive shaft, a plurality of single lobe cams on said drive shaft corresponding in number to the number of pairs of opposed chambers and pumps therein and disposed so that each cam will act alternately against two opposed pump plungers, the position of each cam predetermined so that during rotation of said drive shaft each cam acts against two opposed plungers in a timed sequence whereby all plungers are reciprocated for ejecting fuel to respective injectors in the same sequence as the firing order for the engine, a valved fuel inlet line for each pump operable relative to said fuel passageway and said pump chamber, a valved fuel outlet line for each pump operable relative to said pump chamber and a respective injector, a first means in said housing for acting on the drivable end of said plungers for ejecting fuel from said pump chambers to said injectors in the same sequence as the firing order for said engine, and a second means on said housing operable relative to said plungers and said first means for varying the length of stroke of said plungers for ejecting precise amounts of fuel through said outlet line to said injectors at a rate proportional to desired engine speeds.

15. A fuel injection system as defined in claim 14, including:

a cam follower in each housing chamber operably connected to the drivable end of said plunger therein, each cam follower disposed to be acted on by a corresponding cam in a timed sequence for reciprocating said plungers, a respective control lever engageable with each cam follower for moving the same to position the metering end of said plunger at varying positions within said fuel chamber intermediate said high pressure seal and said first of said pump body to regulate the fuel capacity of said chamber and the amount of fuel ejected therefrom on a given stroke, a lever control means, and linkage means between said lever control means and said control levers whereby the plunger positions in the several pump fuel chambers are simultaneously and similarly controlled by said lever control means in proportion to the desired engine speed.

16. A fuel injection as defined in claim 14 wherein said injector comprises:

a body member provided with a through fuel passageway, an adjustable spring loaded nozzle assembly in said passageway supported in spaced seal members free of contact with said body member, and said seal members being of a material having low friction properties so that said nozzle assembly in operation requires no lubrication from the fuel pumped or from other sources.

17. A fuel injection system as defined in claim 14 wherein said injector comprises:

a body member provided with a through fuel passageway, an adjustable spring loaded nozzle assembly in said passageway supported in spaced seal members free of contact with said body member, said seal members being of a material having low friction properties so that said nozzle assembly in operation requires no lubrication from the fuel pumped or from other sources, a second passageway in said body member, and a thermal heater mounted in said second passageway to extend exteriorly of that end of said body member of said injector mounted in said access port.

* * * * *